Oct. 25, 1927.
F. H. MOYER
1,646,974
METHOD OF WELDING STRUCTURAL MEMBERS
Filed Aug. 20, 1926
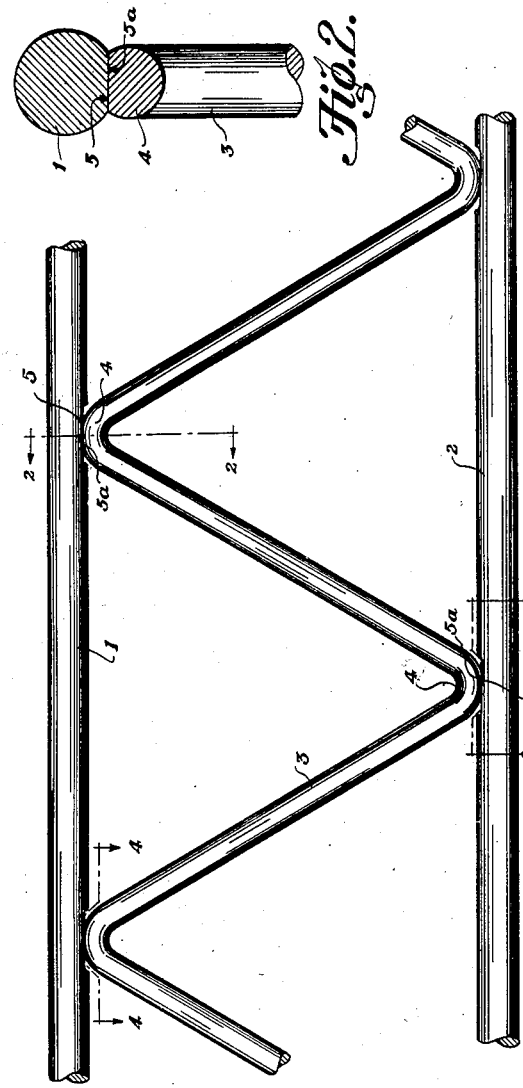
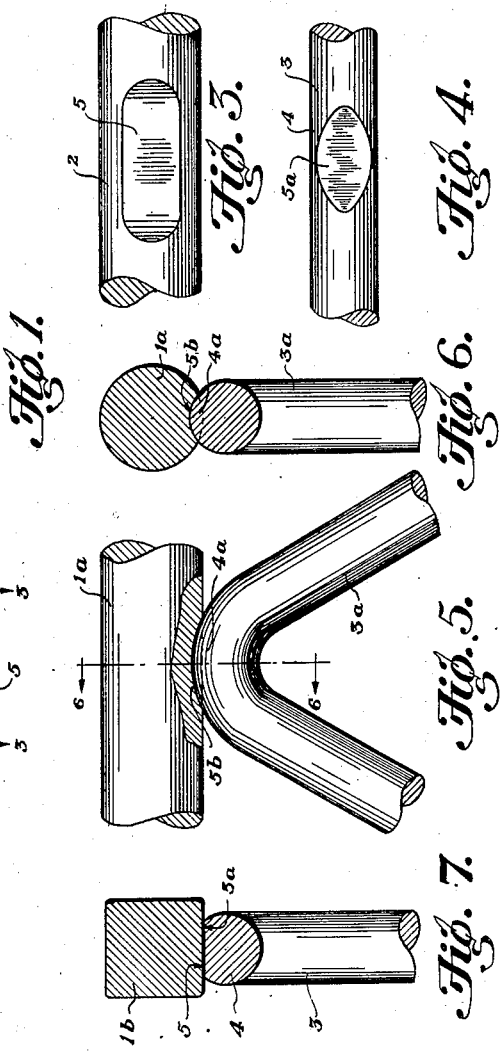
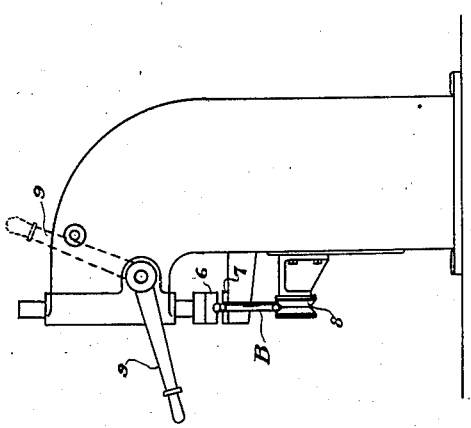
Inventor
Fredellia H. Moyer.
By Frease and Bond
Attorneys Patented Oct. 25, 1927.

1,646,974

UNITED STATES PATENT OFFICE.

FREDELLIA H. MOYER, OF CANTON, OHIO.

METHOD OF WELDING STRUCTURAL MEMBERS.

Application filed August 20, 1926. Serial No. 130,516.

This invention relates to methods of welding and more particularly to the electric machine welding of bar sections.

In recent years a new structure formed of hot rolled bars, taken direct from the rolling mill, has been designed and placed in use as floor joists to take the place of regular rolled steel I-beams or channels, and floor beams, such as are now in general use, formed of two sheet steel channels placed back to back and welded together to give them an I-beam shape.

This new structure is commonly known to the trade as a "bar joist", because of its construction from commercial round bars and its use as a joist for floors in store buildings, apartment houses and similar buildings. This bar joist is usually made up of two parallel bars forming the top chord of the joist and two similar parallel bars spaced therefrom and forming the bottom chord, a web member formed from a single bar bent to form a series of tension and compression members, being provided. The ends of the joists are so arranged that they can be seated on supporting beams or the like forming part of the building in which they are used.

In constructing these bar joists all of the above mentioned bars after being bent and formed into proper shape are clamped in a rig provided for this purpose and the necessary connections for the forming and tying together of the joist parts, and intersecting points, are either gas welded as with an acetylene torch or electrically arc welded by hand, producing when complete a single unit.

It has been found that these bar joists have a decided advantage over the rolled steel or sheet steel structural shapes above referred to both in weight and strength as well as the reduced cost and ease of producing round bars as compared with rolled shapes such as beams, channels and the like.

Since the present method of welding, with either gas or the electric arc, is done by hand it is obvious that in order to increase the production and decrease the manufacturing cost of these bar joists it will be necessary to develop more rapid means of welding the bars together.

The object of the present invention is to provide a method of welding bar sections, which is especially adaptable to the production of these bar joists and which will permit of a rapid welding together of the various bars to produce the finished structure.

The above and other objects may be attained by milling, planing, grinding, pressing or otherwise forming contact surfaces upon the bar sections conforming to the contour of the contacting portions; producing a proper welding area required for electric welding and the like.

An embodiment of the invention is illustrated in the accompanying drawing, in which Figure 1 is an elevation of a typical bar joist constructed in accordance with the invention;

Fig. 2, an enlarged section on the line 2—2, Fig. 1;

Fig. 3, a section on the line 3—3, Fig. 1;

Fig. 4, a section on the line 4—4, Fig. 1;

Fig. 5, a fragmentary view of a bar joist showing a modification of the invention;

Fig. 6, a section on the line 6—6, Fig. 5;

Fig. 7, a sectional view similar to Fig. 2, of a bar joist provided with square chord members;

Fig. 8, a similar section showing double chord members, and

Fig. 9, a side elevation of a standard welding machine fitted with dies and a necessary supporting roller for holding the bar joist while in the machine.

Similar numerals of reference indicate corresponding parts throughout the drawings.

In the manufacture of bar joists, such as above referred to, the use of round bars is preferable to squares, flats or other cross sectional shapes, and the invention is therefore illustrated as applied to bar joists although it should be understood that it is equally applicable to the welding of various bar section shapes.

Where two straight round bars contact with each other they form a line contact and where a curved round bar contacts with another round bar a point contact is formed. In order to employ known methods of machine electric welding, it is impossible to heat up two round bars having line or point contact without burning the metal at the weld and thus destroying the life of the metal and the strength of the weld.

The present invention contemplates the forming of contacting surfaces upon the bars, to be welded, conforming to the meeting portions of the bars; the necessary surface contact between the parts to be joined together by electric welding being produced by milling, planing, grinding or pressing the same upon the bars at the desired locations.

In Fig. 1 is shown a portion of a bar joist constructed in accordance with the invention and including the top and bottom chords 1 and 2, each comprising a round bar of suitable weight and the zig-zag chord member 3 in the form of a round bar of preferably lesser weight bent into zig-zag form and arranged to be connected, by welding, at the bends to the top and bottom chords.

In carrying out the invention each apex or bend 4 of the web member is flattened, as shown at 5, by milling, planing, grinding, pressing or the like.

Each top and bottom chord member is provided at spaced points, arranged to register with the bends of the web member, with similar flattened portions $5^a$ which may be produced in the same manner.

When the bars are all properly prepared for the welding operation they are clamped together with a suitable rig in proper position, the flattened contact surfaces upon the web member contacting with the flattened surfaces upon the chord members, and the loosely assembled structure is placed in position on the electric welding machine shown in Fig. 9. An electric circuit is arranged to be connected to the upper die 6 and lower die 7 of the machine, any suitable switch being provided for controlling the operation of the machine. The bar joist indicated at B is placed in position as shown in Fig. 9 and may be supported as by the roller 8. The operating lever 9 is in the upper or dotted line position and is then brought down to the full line position, shown in Fig. 9, clamping the portion of the joist to be welded and bringing the upper and lower dies into close contact with the members of the joist to be welded.

The current is then applied to the dies, by operating the switch, a high current at low voltage being allowed to pass through the metal at the point to be welded.

When the metal has reached the welding temperature further pressure is applied to the heated metal through the welding dies, by further downward movement of the lever 9, and the weld is complete.

In Figs. 5 and 6 is shown a modification of the invention in which a concaved contact surface $5^b$ is formed in the chord $1^a$ conforming to the bent portion $4^a$ of the web bar $3^a$.

Another modification of the invention is shown in Fig. 7 in which the web 3 is provided with the flattened contact surface 5 at the bend 4, in the same manner as shown in Figs. 1, 2 and 4, square chord bars $1^b$ being provided, the flat contact surface 5 of the web engaging a flat side of each chord bar.

In Fig. 8 is shown a still further modification, in which double chord bars $1^c$ are used, each having the flattened contact surface $5^c$ arranged to be engaged by the angular contact surface $5^d$ formed upon the bent portion of the web bar $3^b$.

If desired, instead of milling, planing or otherwise providing the contact surfaces for the welding as above described, the bars can be furnished in hot rolled form having this surface its entire length, or they may be cold drawn to this shape.

Although the invention is illustrated as applied to bar joists it should be understood that it is equally applicable to truss members, purlins, columns, girts, eave struts, and the like, which may be made up not only of round bars, but of any desired shape of bar sections, the meeting faces of which are provided with contact surfaces conforming to one another in order to provide sufficient welding area.

I claim:

1. The method of welding bar structures comprising chord members and intervening web members, which consists in forming contact surfaces upon the chord members conforming to the contour of the contact surfaces of the web members, clamping said contact surfaces together and applying heat and pressure thereto.

2. The method of welding bar structures comprising chord members and intervening web members, which consists in forming contact surfaces upon the chord members conforming to the contour of the contact surfaces of the web members, clamping said contact surfaces together and applying electric current and pressure thereto.

3. The method of welding bar structures comprising chord members and intervening web members, which consists in forming flat contact surfaces upon the chord members and web members, clamping said contact surfaces together and applying heat and pressure thereto.

4. The method of welding bar structures comprising chord members and intervening web members, which consists in forming flat contact surfaces upon the chord members and web members, clamping said contact surfaces together and applying electric current and pressure thereto.

5. The method of welding bar structures comprising chord members and intervening web members, which consists in forming contact surfaces upon the chord members to conform to the web member, clamping the web member against said contact surfaces, and applying heat and pressure thereto.

6. The method of welding bar structures comprising chord members and intervening web members, which consists in forming contact surfaces upon the chord members to conform to the web member, clamping the web member against said contact surfaces, and applying electric current and pressure thereto.

In testimony that I claim the above, I have hereunto subscribed my name.

FREDELLIA H. MOYER.